United States Patent (10) Patent No.: US 12,553,699 B2
Nakano                                     (45) Date of Patent:     Feb. 17, 2026

(54) INSPECTION METHOD, MANUFACTURING METHOD AND INSPECTION SYSTEM OF DISK DRIVE SUSPENSION

(71) Applicant: NHK SPRING CO., LTD., Yokohama (JP)

(72) Inventor: Kenichiro Nakano, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 407 days.

(21) Appl. No.: 17/986,408

(22) Filed: Nov. 14, 2022

(65) Prior Publication Data

US 2023/0168072 A1    Jun. 1, 2023

(30) Foreign Application Priority Data

Nov. 26, 2021 (JP) .................................. 2021-192145

(51) Int. Cl.
*G01B 5/06* (2006.01)
*G11B 27/36* (2006.01)

(52) U.S. Cl.
CPC .............. *G01B 5/061* (2013.01); *G11B 27/36* (2013.01)

(58) Field of Classification Search
CPC ........ G01B 5/061; G01B 5/02; G01B 11/002; G01B 11/0608; G01B 11/0616; G01B 11/28; G01B 2210/50; G11B 27/36; G11B 5/4806; G11B 5/4833; G01N 21/8422

See application file for complete search history.

(56) References Cited

U.S. PATENT DOCUMENTS

| 7,436,062 | B2 * | 10/2008 | Kainuma ................ H01L 24/75 257/737 |
| 8,630,067 | B2 * | 1/2014 | Ando ................... G11B 5/5552 360/294.4 |
| 11,039,561 | B2 * | 6/2021 | Futamura ........... G01B 11/0608 |
| 11,602,928 | B2 * | 3/2023 | Nakano ................... B32B 41/00 |
| 12,176,012 | B2 * | 12/2024 | Ogaki .................... G11B 5/484 |
| 2001/0043443 | A1 * | 11/2001 | Okamoto ............... G11B 21/16 |
| 2010/0085663 | A1 | 4/2010 | Ando et al. |

(Continued)

FOREIGN PATENT DOCUMENTS

| CN | 101714359 A | 5/2010 |
| CN | 102539437 A | 7/2012 |

(Continued)

OTHER PUBLICATIONS

Chinese Office Action (and an English language translation thereof) dated Feb. 13, 2025, issued in counterpart Chinese Application No. 202211345063.1.

*Primary Examiner* — Octavia Hollington
(74) *Attorney, Agent, or Firm* — Holtz, Holtz & Volek PC

(57) ABSTRACT

According to an embodiment, an inspection method inspects a disk drive suspension including an electronic component having first and second side surfaces in a first direction, a first and second adhesives provided along the side surfaces. The method includes measuring a first height in a first position of the first adhesive, measuring a second height in a second position of the second adhesive, and determining whether at least one of a position of application of the first and second adhesives in the first direction and an amount of application of the first and second adhesives is appropriate based on the first and second heights.

7 Claims, 9 Drawing Sheets

(56) References Cited

U.S. PATENT DOCUMENTS

| | | | |
|---|---|---|---|
| 2010/0108256 A1* | 5/2010 | Roajanasiri | G11B 5/4826 |
| | | | 156/578 |
| 2011/0242708 A1* | 10/2011 | Fuchino | G11B 5/4806 |
| 2020/0015396 A1* | 1/2020 | Futamura | G06T 7/0004 |
| 2022/0097357 A1 | 3/2022 | Nakano | |
| 2022/0101876 A1* | 3/2022 | Ogaki | G11B 5/483 |
| 2025/0078865 A1* | 3/2025 | Ogaki | G11B 5/483 |

FOREIGN PATENT DOCUMENTS

| | | | | | |
|---|---|---|---|---|---|
| JP | 2006289295 | A | * | 10/2006 | |
| JP | 2011112420 | A | * | 6/2011 | |
| JP | 2013235633 | A | * | 11/2013 | G11B 5/48 |
| JP | 2014077726 | A | * | 5/2014 | |
| JP | 2018093081 | A | | 6/2018 | |
| KR | 20210004192 | A | * | 1/2021 | |

* cited by examiner

INSPECTION METHOD, MANUFACTURING METHOD AND INSPECTION SYSTEM OF DISK DRIVE SUSPENSION

CROSS-REFERENCE TO RELATED APPLICATIONS

This application is based upon and claims the benefit of priority from prior Japanese Patent Application No. 2021-192145, filed Nov. 26, 2021, the entire contents of which are incorporated herein by reference.

BACKGROUND OF THE INVENTION

1. Field of the Invention

The present invention relates to an inspection method, a manufacturing method and an inspection system of a disk drive suspension used for a hard disk drive, etc.

2. Description of the Related Art

Hard disk drives (HDD) are used for information processing devices such as personal computers. A hard disk drive includes a magnetic disk which rotates around a spindle, and a carriage which pivots on a pivot. The carriage comprises an actuator arm and pivots on the pivot in the track width direction of a disk by a positioning motor such as a voice coil motor.

A disk drive suspension (or simply referred to as a suspension) is attached to the actuator arm. The suspension includes a load beam, a flexure provided so as to overlap the load beam, etc. A slider which constitutes a magnetic head is attached to a gimbal portion formed near the distal end of the flexure. In the slider, an element (transducer) for performing access such as data read or write is provided.

To correspond to the increase in the recording density of the disk, the position of the magnetic head needs to be determined with higher accuracy with respect to the recording surface of the disk. For this reason, in addition to a positioning motor, a suspension comprising an actuator element consisting of a piezoelectric body such as lead zirconate titanate (PZT) is developed. In this type of suspension, the distal end side of the suspension can be moved a tiny amount at high speed in a sway direction (track width direction) by deforming the actuator element.

In connection with the operation of the actuator element, particles may drop from a side surface of the actuator element. As a method for preventing this phenomenon, the side surface can be covered with an adhesive. In this case, if the adhesive is displaced from the design position of application, or the amount of the application of the adhesive is inappropriate, defects such as a detrimental effect to the operation of the actuator element may be caused. To prevent these defects, the position and amount of the application of the adhesive need to be inspected. Adhesives used for the attachment of various types of electronic components other than an actuator element also require this type of inspection.

For example, JP 2018-93081 A discloses an electronic component mounting system which, when an electronic component is mounted on a substrate to which an adhesive (application agent) has been applied, statistically processes the state of the application agent (the position of application, the area of application and the thickness of application), calculates the amount of change over time and performs feedback control for an application device such that the amount of change is reduced. However, the document does not disclose a specific inspection method for the position of application, etc., or does not refer to the inspection of the position or amount of application at all regarding individual products including the substrate and the electronic component.

BRIEF SUMMARY OF THE INVENTION

An object of the present invention is to provide an inspection method which can accurately inspect a suspension including an adhesive, and a manufacturing method and inspection system of the suspension.

According to one embodiment, an inspection method inspects a disk drive suspension including an electronic component comprising first and second side surfaces arranged in a first direction, a first adhesive provided along the first side surface, and a second adhesive provided along the second side surface. The method comprises measuring a first height in a first position of the first adhesive, measuring a second height in a second position of the second adhesive, and determining whether at least one of a position of application of the first adhesive and the second adhesive in the first direction and an amount of application of the first adhesive and the second adhesive is appropriate based on the first height and the second height.

According to another aspect of the embodiment, a manufacturing method manufactures a disk drive suspension including an electronic component comprising first and second side surfaces arranged in a first direction, a first adhesive provided along the first side surface, and a second adhesive provided along the second side surface. The method comprises applying the first adhesive and the second adhesive, measuring a first height in a first position of the first adhesive, measuring a second height in a second position of the second adhesive, and determining whether at least one of a position of application of the first adhesive and the second adhesive in the first direction and an amount of application of the first adhesive and the second adhesive is appropriate based on the first height and the second height.

According to yet another aspect of the embodiment, an inspection system inspects a disk drive suspension including an electronic component comprising first and second side surfaces arranged in a first direction, a first adhesive provided along the first side surface, and a second adhesive provided along the second side surface. The system comprises a measurement device which measures a first height in a first position of the first adhesive and a second height in a second position of the second adhesive, and a control device which determines whether at least one of a position of application of the first adhesive and the second adhesive in the first direction and an amount of application of the first adhesive and the second adhesive is appropriate based on the first height and the second height.

The present invention can provide an inspection method which can accurately inspect a suspension including an adhesive, and a manufacturing method and inspection system of the suspension.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

In the present embodiment, this specification describes a dual stage actuator (DSA) type of suspension as an example of a disk drive suspension. However, the main structure related to the inspection method, manufacturing method and inspection system of the suspension disclosed in the embodiment can be also applied to various other types of suspensions including an adhesive.

Figure 1:
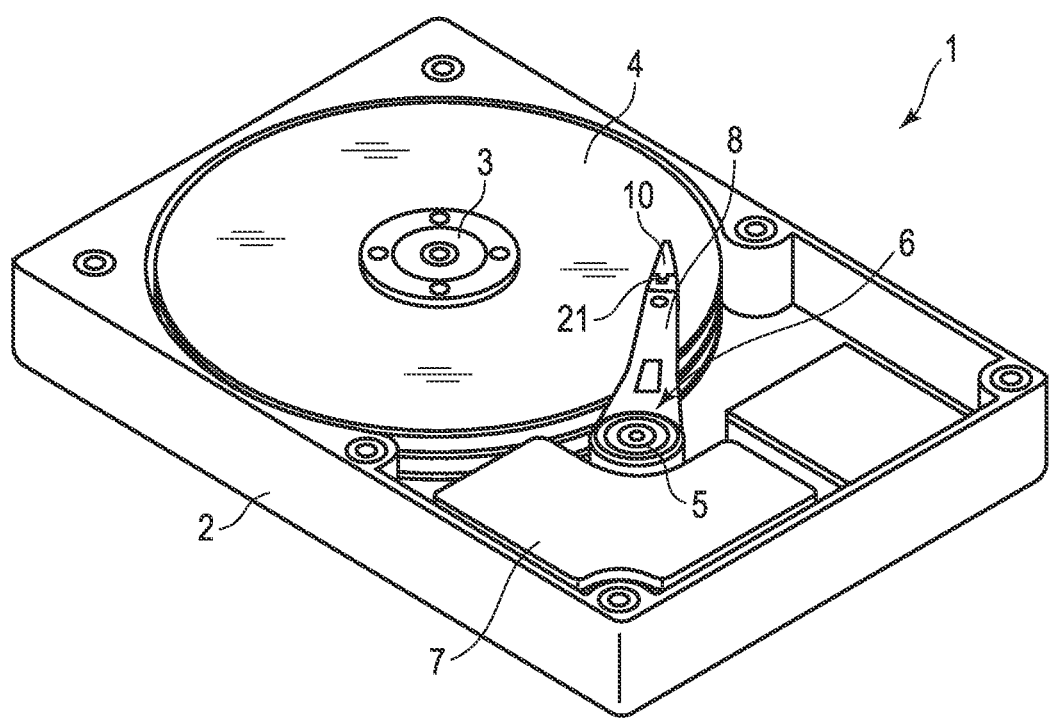
FIG. 1 is a perspective view schematically showing an example of a disk drive according to an embodiment.

FIG. 1 is a perspective view schematically showing an example of a disk drive (HDD) 1. The disk drive 1 comprises a case 2, a plurality of disks 4 which rotate around a spindle 3, a carriage 6 which can pivot on a pivot 5, and a positioning motor (voice coil motor) 7 for driving the carriage 6. The case 2 is sealed by a cover (not shown).

Figure 2:
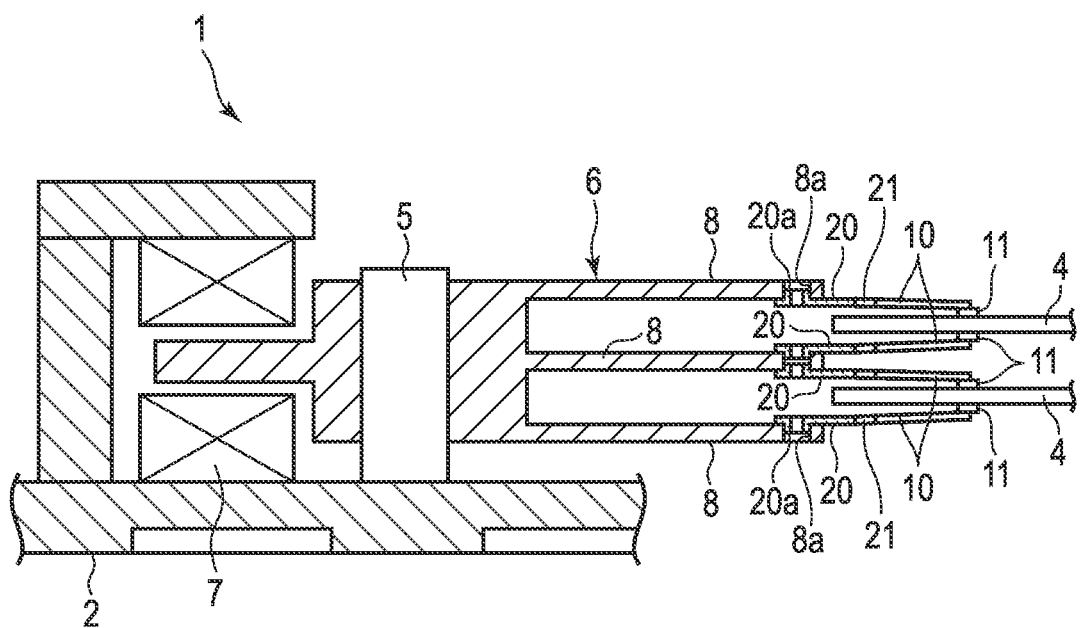
FIG. 2 is a cross-sectional view schematically showing part of the disk drive according to the embodiment.

FIG. 2 is a cross-sectional view schematically showing part of the disk drive 1. As shown in FIG. 1 and FIG. 2, a plurality of arms (carriage arms) 8 are provided in the carriage 6. A suspension 10 is attached to the distal end portion of each arm 8. A slider 11 which constitutes a magnetic head is provided in the distal end portion of each suspension 10. When the disks 4 rotate at high speed, air inflows between the disks 4 and the sliders 11, thereby forming an air bearing.

In the example of FIG. 2, each suspension 10 comprises a baseplate 20. In the base plate 20, a boss portion 20a inserted into a hole 8a formed in the arm 8 is formed.

When the carriage 6 is caused to pivot by the positioning motor 7, the suspensions 10 move in the radial direction of the disks 4, and the sliders 11 move to the desired track of the disks 4.

Figure 3:
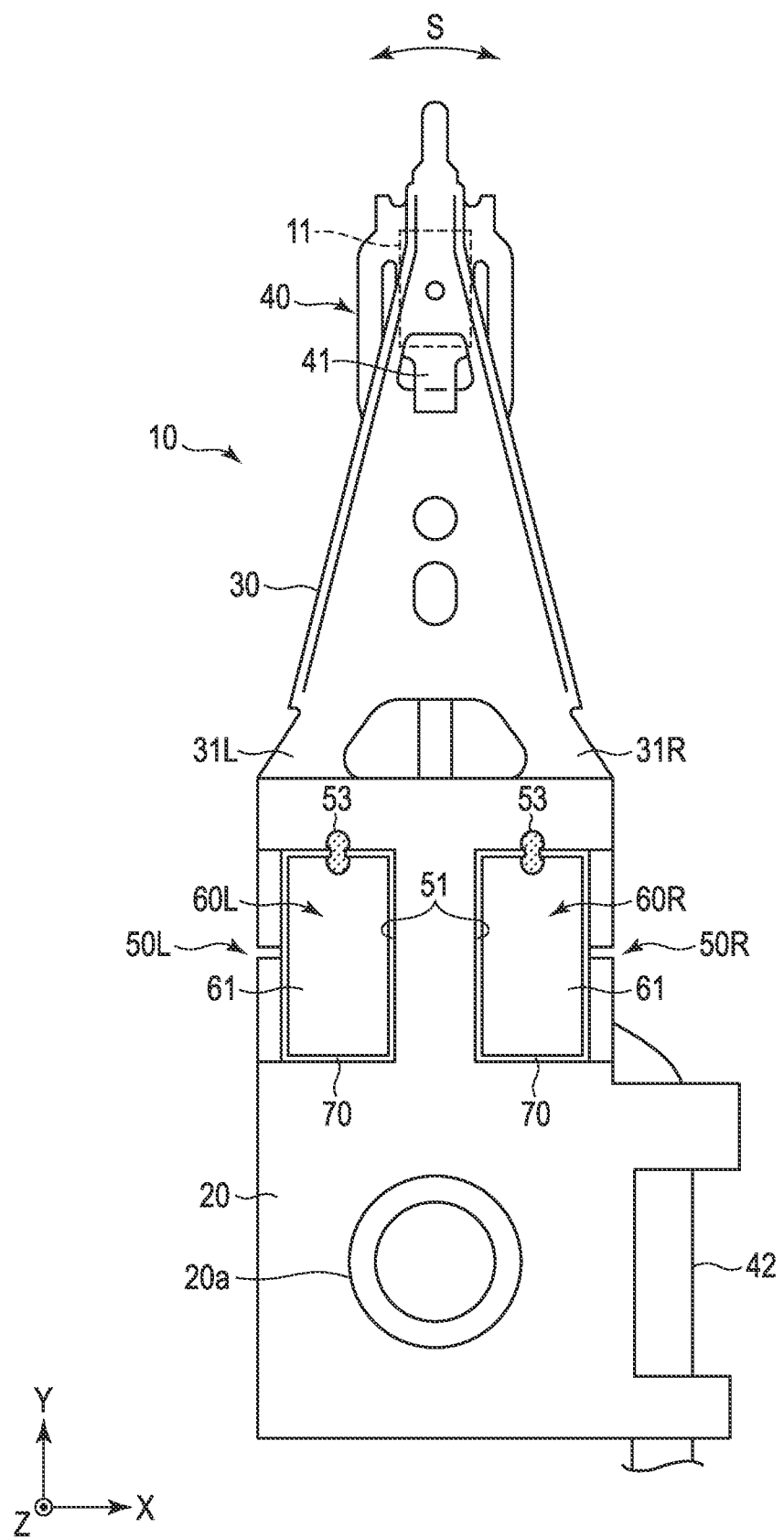
FIG. 3 is a plan view schematically showing a suspension according to the embodiment.
Figure 4:
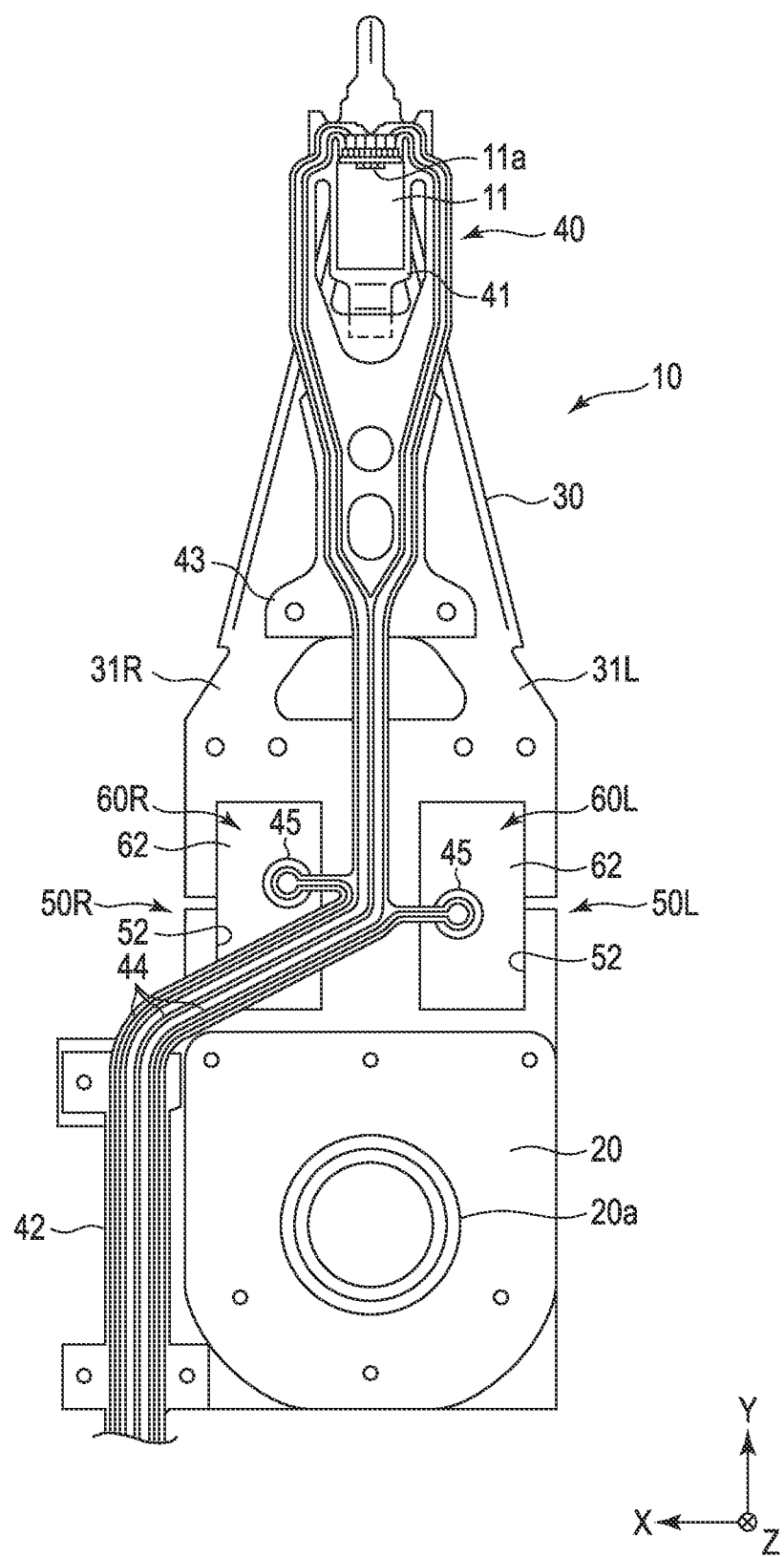
FIG. 4 is a plan view schematically showing the suspension when it is viewed from the opposite side of FIG. 3.

FIG. 3 is a plan view schematically showing the suspension 10 according to the embodiment. FIG. 4 is a plan view schematically showing the suspension 10 when it is viewed from the opposite side of FIG. 3. The suspension 10 comprises the baseplate 20 described above, a load beam 30, and a flexure 40 with lines. In the present embodiment, the baseplate 20 is an example of a first plate, and the load beam 30 is an example of a second plate.

In the following explanation, a first direction X, a second direction Y, a third direction Z and a sway direction S are defined as shown in FIG. 3. The first direction X, the second direction Y and the third direction Z intersect each other. In the present embodiment, they are orthogonal to each other. The first direction X is equivalent to the width direction of the suspension 10, the baseplate 20, the load beam 30, the flexure 40, etc. The second direction Y is equivalent to the length direction of the suspension 10, the baseplate 20, the load beam 30, the flexure 40, etc. The third direction Z is equivalent to the thickness direction of the suspension 10, the baseplate 20, the load beam 30, the flexure 40, etc. The sway direction S is a direction in which the distal end of the load beam 30 sways laterally in FIG. 3.

In the base portion (proximal portion) of the load beam 30, a pair of hinge portions 31L and 31R which can be elastically deformed in the third direction Z is formed. These hinge portions 31L and 31R are arranged in the first direction X across an intervening space.

As shown in FIG. 4, the flexure 40 is provided along the load beam 30. Near the distal end portion of the load beam 30, the flexure 40 comprises a tongue 41 which functions as a gimbal portion. The slider 11 which constitutes the magnetic head is attached to the tongue 41. A tail portion 42 provided in the flexure 40 extends to the rear of the baseplate 20.

In an end portion of the slider 11, an element 11a which can convert magnetic signals into electric signals such as an MR element is provided. By the element 11a, data write or read is performed for the disks 4. The slider 11, the load beam 30, the flexure 40 and the like constitute a head gimbal assembly.

The flexure 40 comprises a metal base 43 formed of, for example, stainless steel, and a plurality of lines 44 formed on the metal base 43. The lines 44 are covered with an insulating layer of polyimide, etc. The metal base 43 is fixed to the load beam 30 by, for example, laser spot welding. The lines 44 are partly connected to the slider 11.

The suspension 10 further comprises a pair of actuator mounting portions 50L and 50R, and a pair of actuator elements 60L and 60R. The actuator elements 60L and 60R are mounted on the actuator mounting portions 50L and 50R, respectively, by an electrically insulating adhesive 70 such as epoxy resin.

The actuator mounting portions 50L and 50R are located between the boss portion 20a provided in the baseplate 20 and the hinge portions 31L and 31R, and are arranged in the first direction X. The actuator elements 60L and 60R have a function of moving the load beam 30 in the sway direction S.

As shown in FIG. 3, the baseplate 20 comprises a notch 51 in each of the actuator mounting portions 50L and 50R.

These notches 51 are depressed toward the center of the baseplate 20 in the first direction X.

As shown in FIG. 4, the load beam 30 comprises an opening 52 in each of the actuator mounting portions 50L and 50R. These openings 52 overlap the notches 51 shown in FIG. 3.

The actuator element 60L is provided so as to cover the opening 52 inside the notch 51 of the actuator mounting portion 50L. The actuator element 60R is provided so as to cover the opening 52 inside the notch 51 of the actuator mounting portion 50R.

The surface of each of the actuator elements 60L and 60R shown in FIG. 3 is covered with a first electrode 61. These first electrodes 61 are connected to the baseplate 20 by a conductive material 53.

The surface of each of the actuator elements 60L and 60R shown in FIG. 4 is covered with a second electrode 62. These second electrodes 62 are connected to part of the lines 44 by terminals 45 extending from the flexure 40.

Figure 5:
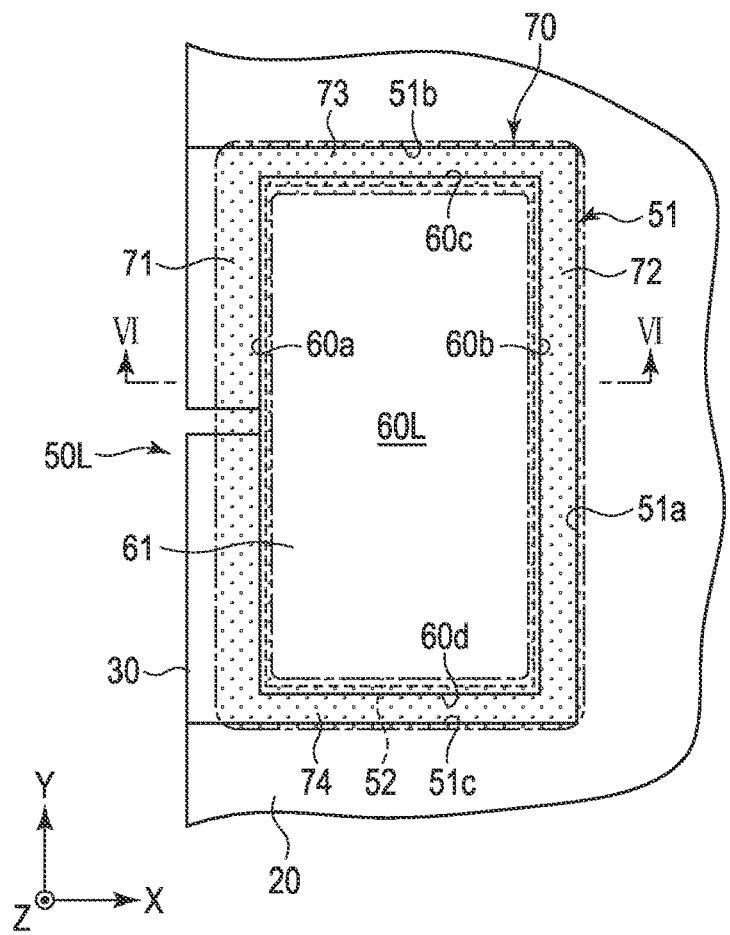
FIG. 5 is a plan view schematically showing a magnified view of an actuator mounting portion and an actuator element according to the embodiment.

FIG. 5 is a plan view schematically showing a magnified view of the actuator mounting portion 50L and the actuator element 60L. In the figure, the dotted area surrounded by alternate long and short dash lines is equivalent to the adhesive 70.

As shown in FIG. 5, the notch 51 comprises a first inner wall 51a, a second inner wall 51b and a third inner wall 51c. For example, the first inner wall 51a is parallel to the second direction Y. The second inner wall 51b and the third inner wall 51c are parallel to the first direction X.

Further, the actuator element 60L comprises a first side surface 60a, a second side surface 60b, a third side surface 60c and a fourth side surface 60d. The first side surface 60a and the second side surface 60b are both parallel to the second direction Y and are arranged in the first direction X. The third side surface 60c and the fourth side surface 60d are both parallel to the first direction X and are arranged in the second direction Y. In the present embodiment, both the first side surface 60a and the second side surface 60b are longer than the first side surface 60c and the fourth side surface 60d. The second side surface 60b faces the first inner wall 51a. The third side surface 60c faces the second inner wall 51b. The fourth side surface 60d faces the third inner wall 51c.

In the example of FIG. 5, the adhesive 70 is annularly formed so as to surround the actuator element 60L. Specifically, the adhesive 70 includes a first adhesive 71 provided along the first side surface 60a, a second adhesive 72 provided along the second side surface 60b, a third adhesive 73 provided along the third side surface 60c, and a fourth adhesive 74 provided along the fourth side surface 60d. The first adhesive 71 and the second adhesive 72 have a shape which is long in the second direction Y. The third adhesive 73 and the fourth adhesive 74 have a shape which is long in the first direction X. These adhesives 71, 72, 73 and 74 are not necessarily connected to each other and may be cut at least in part of them.

Figure 6:
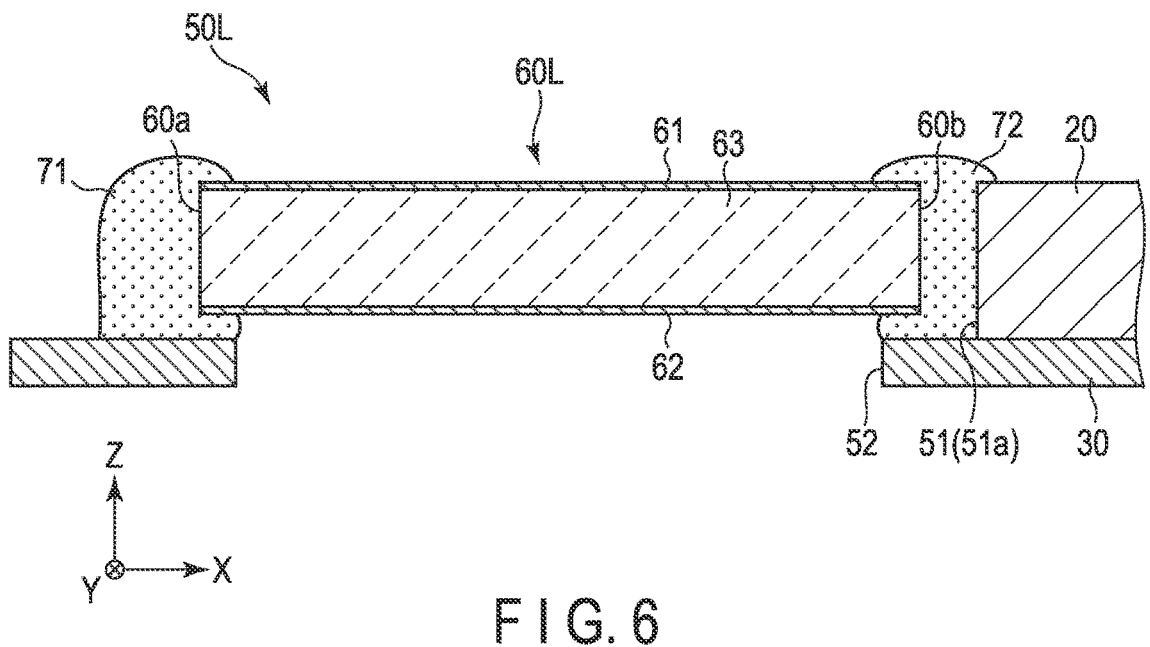
FIG. 6 is a cross-sectional view schematically showing the actuator mounting portion and the actuator element along the VI-VI line of FIG. 5.

FIG. 6 is a cross-sectional view schematically showing the actuator mounting portion 50L and the actuator element 60L along the VI-VI line of FIG. 5. In addition to the first electrode 61 and the second electrode 62 described above, the actuator element 60L comprises a piezoelectric body 63 provided between these electrodes 61 and 62. The piezoelectric body 63 is formed of, for example, PZT, and is deformed based on the voltage between the electrodes 61 and 62.

The first adhesive 71 covers the first side surface 60a and is in contact with the upper surface of the load beam 30. A part of the first adhesive 71 protrudes to the upper side compared to the actuator element 60L and covers the rim of the first electrode 61. Another part of the first adhesive 71 is interposed between the load beam 30 and the actuator element 60L and covers the rim of the second electrode 62.

The second adhesive 72 is put between the second side surface 60b and the baseplate 20 (the first inner wall 51a) and is in contact with the upper surface of the load beam 30. A part of the second adhesive 72 protrudes to the upper side compared to the actuator element 60L and covers the rim of the first electrode 61 and the rim of the upper surface of the baseplate 20. Another part of the second adhesive 72 is interposed between the load beam 30 and the actuator element 60L and covers the rim of the second electrode 62.

The cross-sectional structure of the part including the third adhesive 73 and the fourth adhesive 74 is similar to that of the part including the second adhesive 72 shown in FIG. 6. In other words, the third adhesive 73 is put between the third side surface 60c and the baseplate 20 (the second inner wall 51b) and is in contact with the upper surface of the load beam 30. A part of the third adhesive 73 protrudes to the upper side compared to the actuator element 60L and covers the rim of the first electrode 61 and the rim of the upper surface of the baseplate 20. Another part of the third adhesive 73 is interposed between the load beam 30 and the actuator element 60L and covers the rim of the second electrode 62. The fourth adhesive 74 is put between the fourth side surface 60d and the baseplate 20 (the third inner wall 51c) and is in contact with the upper surface of the load beam 30. A part of the fourth adhesive 74 protrudes to the upper side compared to the actuator element 60L and covers the rim of the first electrode 61 and the rim of the upper surface of the baseplate 20. Another part of the fourth adhesive 74 is interposed between the load beam 30 and the actuator element 60L and covers the rim of the second electrode 62.

FIG. 5 and FIG. 6 show the structure of the actuator mounting portion 50L and the actuator element 60L. It should be noted that the actuator mounting portion 50R and the actuator element 60R have the same structure.

Thus, in the present embodiment, the side surfaces of the actuator elements 60L and 60R are covered with the adhesive 70. By this structure, even when particles are attached to the side surfaces of the actuator elements 60L and 60R, the dropout of the particles can be prevented.

Now, this specification explains the manufacture and inspection of each suspension 10.

Figure 7:
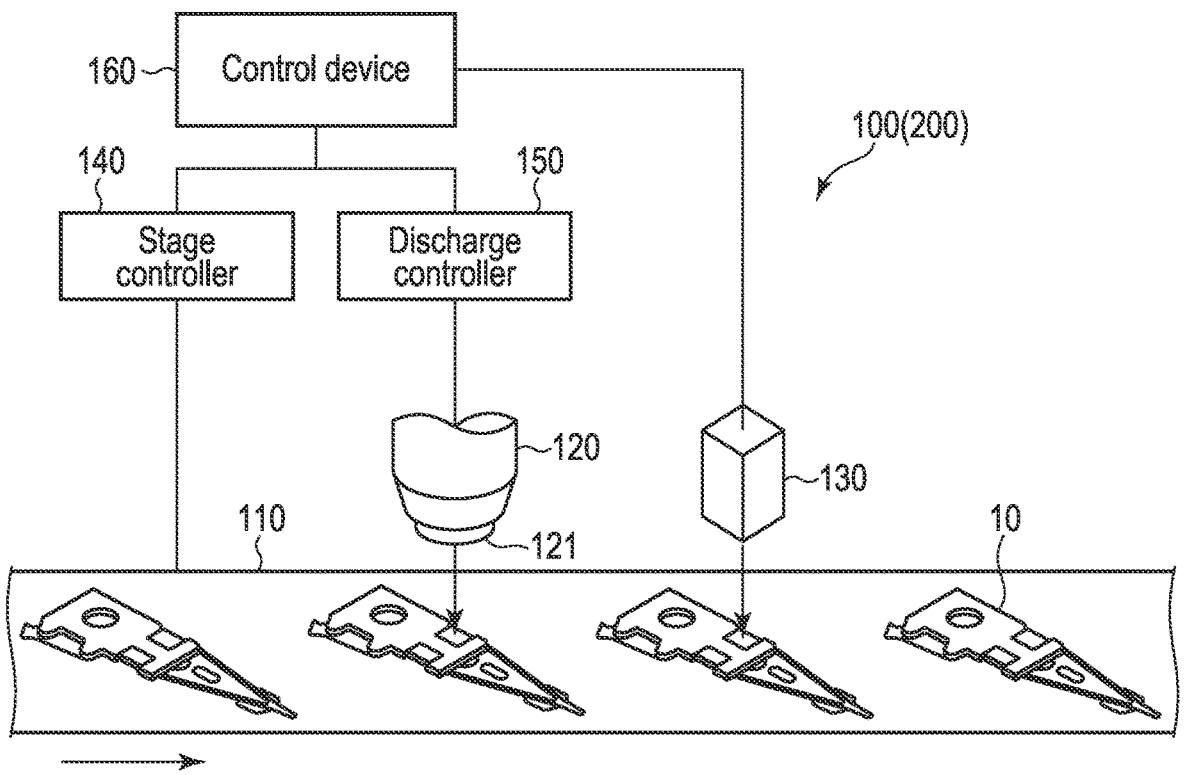
FIG. 7 is a diagram schematically showing the configuration of a manufacturing system (inspection system) according to the embodiment.

FIG. 7 is a diagram schematically showing the configuration of the manufacturing system 100 of each suspension 10. Of the manufacturing system 100, the elements which perform steps related to the inspection of each suspension 10 constitute the inspection system 200 of the suspension 10.

The manufacturing system 100 comprises a carrier device 110, an application device 120, a measurement device 130, a stage controller 140, a discharge controller 150 and a control device 160.

The carrier device 110 is driven by the stage controller 140 and carries each suspension 10 (workpiece) placed on a stage in the middle of manufacturing to the application device 120 and the measurement device 130. The application device 120 is driven by the discharge controller 150 and applies an adhesive to each suspension 10 in a state where at least the actuator mounting portions 50L and 50R are formed. By curing this adhesive, the adhesive 70 described above is formed.

Subsequently, the actuator elements 60L and 60R are provided in the actuator mounting portions 50L and 50R, respectively, and the adhesive 70 is cured. The measurement device 130 targets each suspension 10 in which the adhesive 70 is cured, and measures the height of the adhesive 70. The measurement system of the measurement device 130 is not limited. For example, a white confocal system can be applied. In the white confocal system, the white light emitted from a light source passes through a lens module and is focused in positions which differ from color (wavelength) to color. By detecting the reflected light of a color brought into focus on the surface of the measurement target, the height of the surface is measured.

The control device 160 controls various elements provided in the manufacturing system 100, such as the stage controller 140, the discharge controller 150 and the measurement device 130. The control device 160 comprises a memory in which a computer program and data for realizing operation related to the control or inspection of the elements are stored, and a processor which executes the program.

The application device 120 comprises a nozzle 121 which discharges an adhesive. In the present embodiment, the adhesives 71, 72, 73 and 74 shown in FIG. 5 are simultaneously applied by the nozzle 121.

Figure 8:
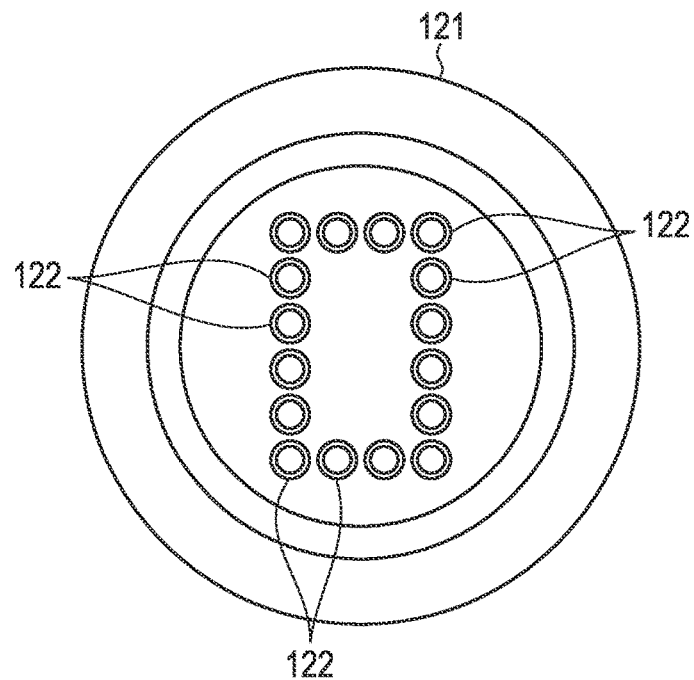
FIG. 8 is a diagram showing an example of the structure of a nozzle provided in an application device according to the embodiment.

FIG. 8 is a diagram showing an example of the structure of the nozzle 121. The nozzle 121 shown in the figure comprises a plurality of discharge ports 122. These discharge ports 122 are provided in a frame shape similar to that of the adhesive 70. By using this nozzle 121, the adhesives 71, 72, 73 and 74 can be simultaneously applied.

For example, the adhesives 70 of the actuator mounting portions 50L and 50R are applied by a single nozzle 121 in series. Alternatively, the adhesives 70 may be simultaneously applied by two nozzles 121.

The control device 160 performs the inspection of each suspension 10 based on the height measured by the measurement device 130 regarding the adhesives 70. The flow of the steps of a manufacturing method including this inspection is explained below.

Figure 9:
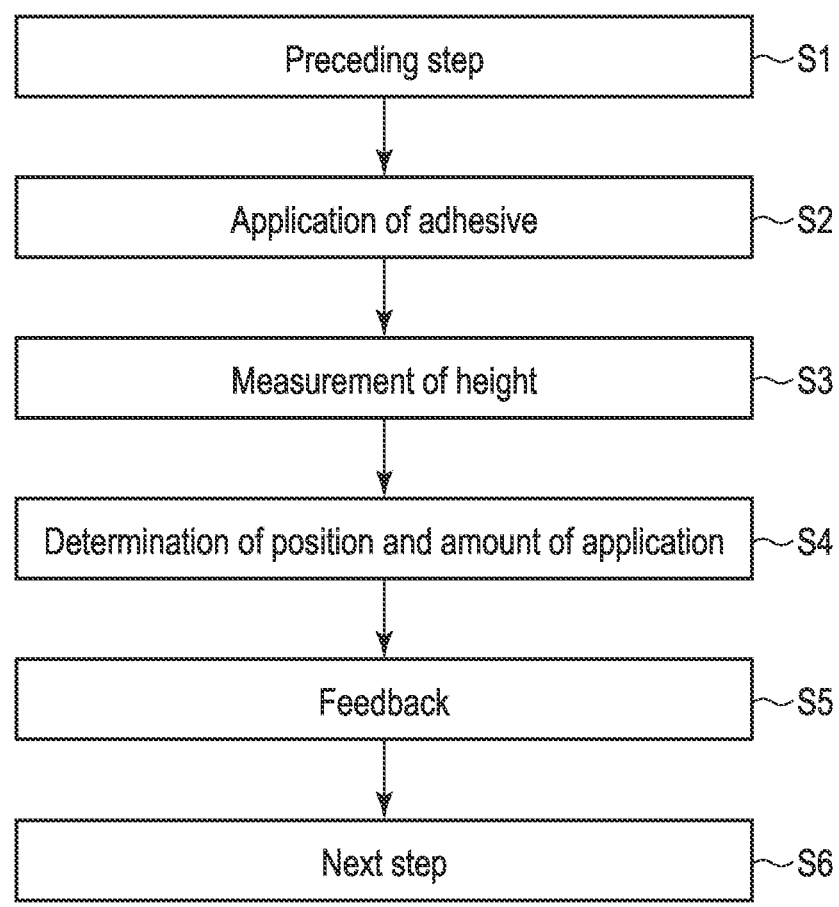
FIG. 9 is a flowchart showing an example of a manufacturing method (inspection method) according to the embodiment.

FIG. 9 is a flowchart showing an example of the manufacturing method (inspection method) of each suspension 10. Here, this specification mainly focuses on steps related to the application and inspection of the adhesives 70 in the manufacture of a single suspension 10, and omits the detailed description of the other steps.

In the flowchart of FIG. 9, first, a preceding step including the attachment of the baseplate 20 and the load beam 30, etc., is performed (step S1). Subsequently, the suspension 10 is carried to a position directly facing the nozzle 121 of the application device 120 by the carrier device 110, and the adhesives 70 are applied by the application device 120 (step S2).

Subsequently, the suspension 10 is carried to the measurement position of the measurement device 130 by the carrier device 110, and the height of each adhesive 70 is measured by the measurement device 130 (step S3). In the present embodiment, the height of each adhesive 70 is measured regarding a plurality of positions of the adhesive. The details are described later.

Subsequently, based on the height measured in step S3, the control device 160 determines whether or not the position and amount of the application of each adhesive 70 are appropriate (step S4).

When at least one of the position of application and the amount of application is not appropriate, the control device 160 performs feedback which adjusts the control parameters of the carrier device 110 and the application device 120 such that the position and amount of the application of the adhesives for the suspension 10 to be manufactured next are appropriate (step S5).

Subsequently, various processes necessary to complete the suspension 10 are applied (step S6). With regard to the suspension 10 in which at least one of the position of application and the amount of application is not appropriate as a result of the determination of step S4, the subsequent process may not be applied.

Now, this specification explains an example of the measurement of the height in step S3.

Figure 10:
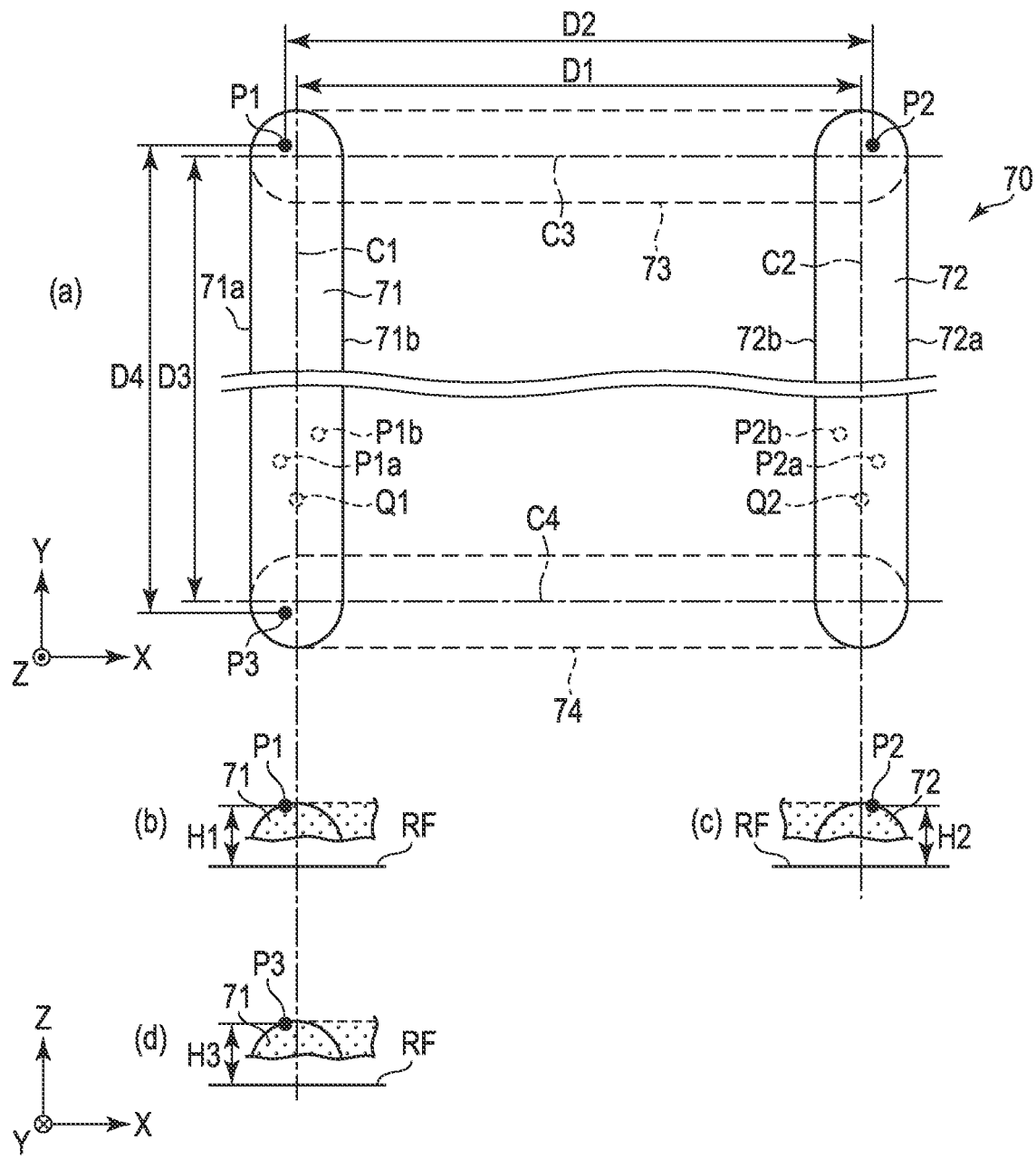
FIG. 10 is a model diagram for explaining the measurement of heights according to the embodiment.

FIG. 10 is a model diagram for explaining the measurement of heights. In the figure, (a) is a plan view of the adhesive 70. The schematic shapes of the first adhesive 71 and the second adhesive 72 are shown by solid lines. The schematic shapes of the third adhesive 73 and the fourth adhesive 74 are shown by broken lines. Further, a first center line C1 which passes through the center (first center) of the first adhesive 71 in the first direction X, a second center line C2 which passes through the center (second center) of the second adhesive 72 in the first direction X, a third center line C3 which passes through the center (third center) of the third adhesive 73 in the second direction Y and a fourth center line C4 which passes through the center (fourth center) of the fourth adhesive 74 in the second direction Y are shown by alternate long and short dash lines. Center lines C1 and C2 are parallel to the second direction Y. Center lines C3 and C4 are parallel to the first direction X. In FIG. 10, the position of the application of the adhesive 70 is assumed to be appropriate.

The first adhesive 71 comprises a first outer edge 71*a* which is more distant from the second adhesive 72 than the first center line C1 in the first direction X, and a first inner edge 71*b* which is closer to the second adhesive 72 than the first center line C1 in the first direction X. The second adhesive 72 comprises a second outer edge 72*a* which is more distant from the first adhesive 71 than the second center line C2 in the first direction X, and a second inner edge 72*b* which is closer to the first adhesive 71 than the second center line C2 in the first direction X.

In the above step S3, the measurement device 130 measures the heights of at least two positions of the adhesive 70, preferably, three or more positions. Hereinafter, this specification assumes a case where the height is measured in the three positions of the first position P1 of the first adhesive 71, the second position P2 of the second adhesive 72 and the third position P3 of the first adhesive 71 as shown in FIG. 10. Further, the distance between the first center line C1 and the second center line C2 is defined as D1. The distance between the first position P1 and the second position P2 in the first direction X is defined as D2. The distance between the third center line C3 and the fourth center line C4 is defined as D3. The distance between the first position P1 and the third position P3 in the second direction Y is defined as D4.

For example, each of the first position P1, the second position P2 and the third position P3 is set so as not to overlap center line C1, C2, C3 or C4 when the position of the application of the adhesive 70 is appropriate as designed. Further, the first position P1, the second position P2 and the third position P3 are set such that distance D2 is different from distance D1, and distance D4 is different from distance D3. For example, the first position P1 and the second position P2 are on a straight line parallel to the first direction X. The first position P1 and the third position P3 are on a straight line parallel to the second direction Y.

In the example of FIG. 10, the first position P1 is between the first center line C1 and the first outer edge 71*a* in the first direction X. The second position P2 is between the second center line C2 and the second outer edge 72*a* in the first direction X. Thus, the first position P1 and the second position P2 are set outside the area located between the first center line C1 and the second center line C2. The first position P1 and the third position P3 are set outside the area located between the third center line C3 and the fourth center line C4.

In FIG. 10, (b), (c) and (d) are cross-sectional views schematically showing the adhesive 70 including the first position P1, the second position P2 and the third position P3. In general, the heights of the adhesives 71, 72, 73 and 74 peak in positions overlapping center lines C1, C2, C3 and C4.

As shown in the cross-sectional views of (b), (c) and (d) of FIG. 10, the height of the adhesive 70 (the first adhesive 71) in the first position P1 is defined as a first height H1, and the height of the adhesive 70 (the second adhesive 72) in the second position P2 is defined as a second height H2, and the height of the adhesive 70 (the first adhesive 71) in the third position P3 is defined as a third height H3.

Heights H1, H2 and H3 are, for example, the heights from a common reference surface RF. As the reference surface RF, for example, the surface of the baseplate 20 or the surface of the load beam 30 may be adopted. However, the reference surface RF is not limited to these examples.

In the present embodiment, this specification assumes a case where a gap is not generated between each of positions P1, P2 and P3 and the baseplate 20 or the load beam 30 when the heights are measured by the measurement device 130. Thus, a difference from the appropriate values of heights H1, H2 and H3 is caused by a difference from the appropriate value of the position or amount of the application of the adhesive 70.

The first position P1 may be set so as not to be aligned with the third adhesive 73 or the fourth adhesive 74 in the first direction X like the first position P1a shown in FIG. 10 by a dashed circle. Similarly, the second position P2 may be set so as not to be aligned with the third adhesive 73 or the fourth adhesive 74 in the first direction X like the second position P2a shown in FIG. 10 by a dashed circle. In addition, the first position P1 may be between the first center line C1 and the first inner edge 71b in the first direction X like the first position P1b shown in FIG. 10 by a dashed circle. Similarly, the second position P2 may be between the second center line C2 and the second inner edge 72b in the first direction X like the second position P2b shown in FIG. 10 by a dashed circle. Similarly, with regard to the third position P3, various portions in the first adhesive 71 could be selected.

Figure 11:
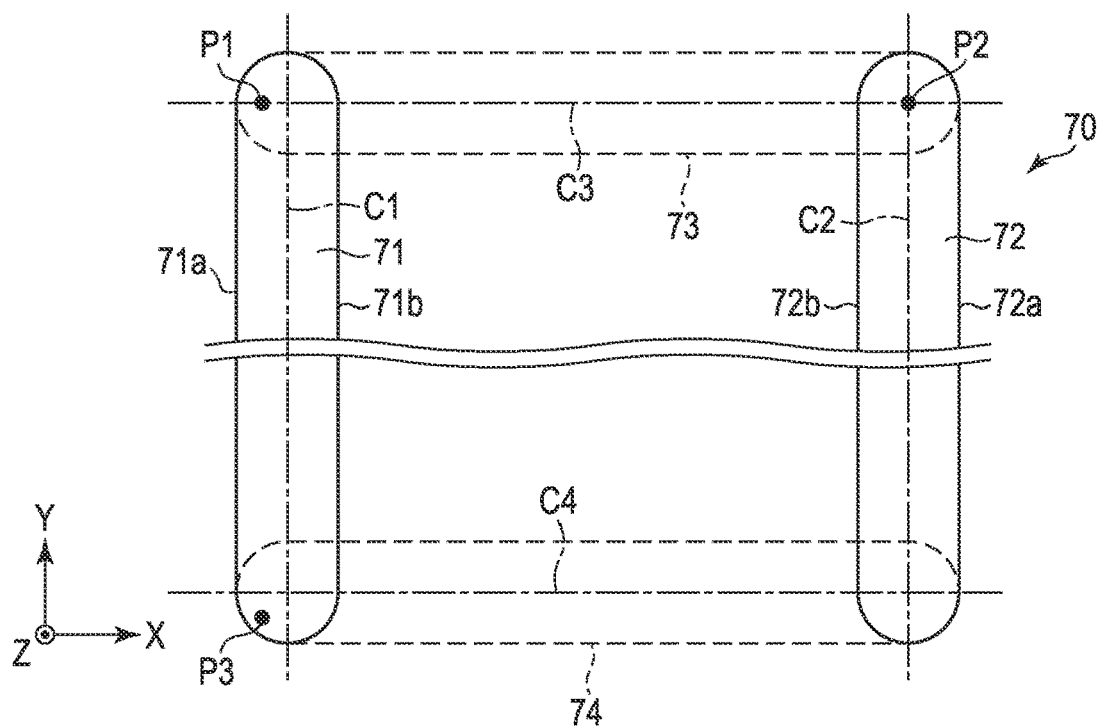
FIG. 11 is a plan view schematically showing an adhesive in which the position of application is displaced from an appropriate position.
Figure 12:
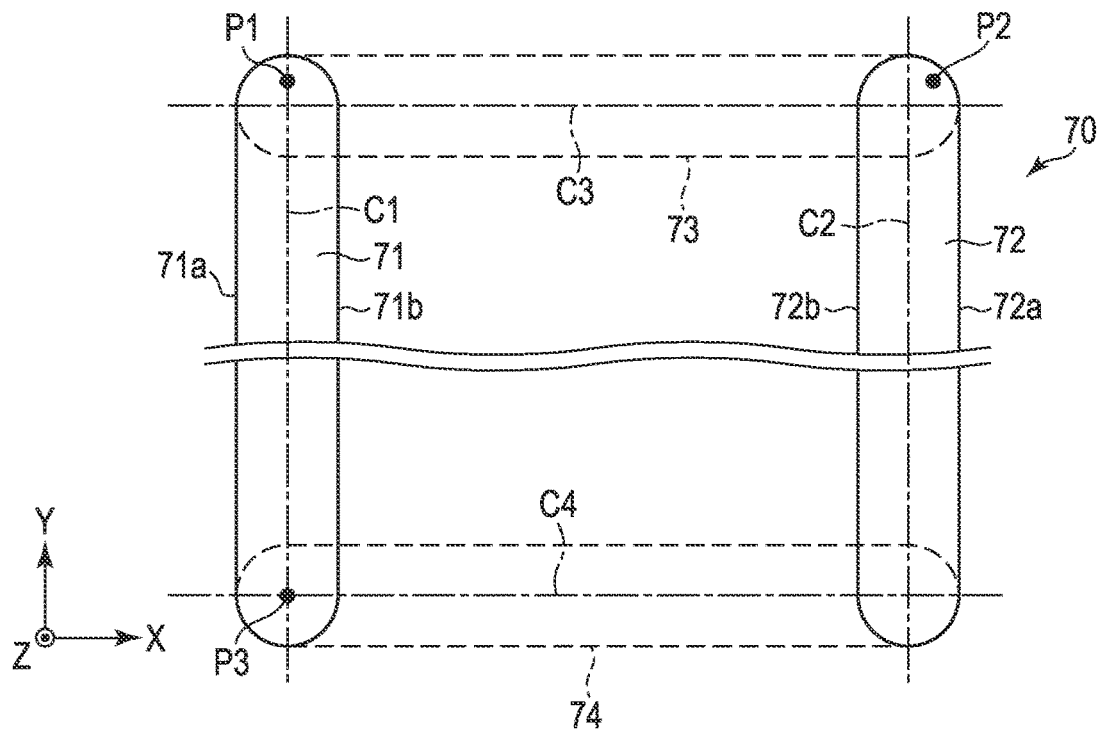
FIG. 12 is another plan view schematically showing the adhesive in which the position of application is displaced from the appropriate position.

Each of FIG. 11 and FIG. 12 is a plan view schematically showing the adhesive 70 in which the position of application is displaced from an appropriate position. Hereinafter, this specification explains an example of the determination of the position of the application of the adhesive 70 and the determination of the amount of the application of the adhesive 70 in step S4 and the feedback in step S5 with reference to FIG. 10 to FIG. 12.

[Determination of Position of Application in First Direction X]

When difference $\Delta Ha$ (=H1−H2) between the first height H1 and the second height H2 is different from reference value Hx determined in advance, the control device 160 determines that the position of the application of the adhesive 70 in the first direction X is displaced from an appropriate position. Reference value Hx is an example of a first reference value.

For example, reference value Hx is determined in consideration of the difference in the height between the first adhesive 71 and the second adhesive 72 applied to appropriate positions. In the present embodiment, as shown in FIG. 6, the second adhesive 72 is put in the gap between the baseplate 20 and the actuator element 60L (or the actuator element 60R). However, the first adhesive 71 is not put in such a gap. Thus, the height of the second adhesive 72 could be greater than that of the first adhesive 71 overall. Therefore, reference value Hx may be set to be a value equivalent to the difference in height which could be caused near the first position P1 and the second position P2 in the first and second adhesives 71 and 72 which are appropriately applied.

Reference value Hx may be zero. Alternatively, reference value Hx may be a numerical range determined by an upper limit and a lower limit. When reference value Hx is a numerical range, the expression "difference $\Delta Ha$ is coincident with reference value Hx" in the following descriptions means that difference $\Delta Ha$ is included in the numerical range. The expression "difference $\Delta Ha$ is not coincident with reference value Hx" means that difference $\Delta Ha$ is not included in the numerical range.

When the position of the adhesive 70 is appropriate as shown in FIG. 10, difference $\Delta Ha$ is coincident with reference value Hx. In this case, the control device 160 determines that the position of the adhesive 70 in the first direction X is appropriate.

To the contrary, in the example of FIG. 11, the second position P2 is on the intersection point of the second center line C2 and the third center line C3. Thus, compared to a case where the position of the application of the adhesive 70 is appropriate, the second height H2 is increased, and difference $\Delta Ha$ changes in a negative direction. As a result, difference $\Delta Ha$ is less than reference value Hx, and they are not coincident with each other. In this case, the control device 160 determines that the adhesive 70 is displaced from the appropriate position to the right side of the figure (in a direction from the first adhesive 71 to the second adhesive 72).

In the example of FIG. 12, the second position P2 is moved to the vicinity of the edge of the second adhesive 72. Thus, compared to a case where the position of the application of the adhesive 70 is appropriate, the second height H2 is decreased, and difference $\Delta Ha$ changes in a positive direction. As a result, difference $\Delta Ha$ is greater than reference value Hx, and they are not coincident with each other. In this case, the control device 160 determines that the adhesive 70 is displaced from the appropriate position to the left side of the figure (in a direction from the second adhesive 72 to the first adhesive 71).

[Determination of Position of Application in Second Direction Y]

When difference $\Delta Hb$ (=H1−H3) between the first height H1 and the third height H3 is different from reference value Hy determined in advance, the control device 160 determines that the position of the application of the adhesive 70 in the second direction Y is displaced from an appropriate position. Reference value Hy is another example of the first reference value.

For example, reference value Hy is determined in consideration of the difference between the first height H1 and the third height H3 in the first adhesive 71 which is applied to the appropriate position. Reference value Hy may be zero. Alternatively, reference value Hy may be a numerical range determined by an upper limit and a lower limit. When reference value Hy is a numerical range, the expression "difference $\Delta Hb$ is coincident with reference value Hy" in the following descriptions means that difference $\Delta Hb$ is included in the numerical range. The expression "difference ΔHb is not coincident with reference value Hy" means that difference ΔHb is not included in the numerical range.

When the position of the adhesive 70 is appropriate as shown in FIG. 10, difference ΔHb is coincident with reference value Hy. In this case, the control device 160 determines that the position of the adhesive 70 in the second direction Y is appropriate.

To the contrary, in the example of FIG. 11, the first position P1 is on the third center line C3, and the third position P3 is moved to the vicinity of the edge of the first adhesive 71. Thus, compared to a case where the position of the application of the adhesive 70 is appropriate, the first height H1 is increased, and the third height H3 is decreased, and difference ΔHb changes in a positive direction. As a result, difference ΔHb is greater than reference value Hy, and they are not coincident with each other. In this case, the control device 160 determines that the adhesive 70 is displaced from the appropriate position to the upper side of the figure (in a direction from the fourth adhesive 74 to the third adhesive 73).

In the example of FIG. 12, the third position P3 is moved to the intersection point of the first center line C1 and the fourth center line C4. Thus, compared to a case where the position of the application of the adhesive 70 is appropriate, the third height H3 is increased, and difference ΔHb changes in a negative direction. As a result, difference ΔHb is less than reference value Hy, and they are not coincident with each other. In this case, the control device 160 determines that the adhesive 70 is displaced from the appropriate position to the lower side of the figure (in a direction from the third adhesive 73 to the fourth adhesive 74).

[Determination of Amount of Application]

The control device 160 determines that the amount of the application of the adhesive 70 is greater than the appropriate amount of application when at least two of heights H1, H2 and H3, or preferably all of them, are greater than reference value Hm determined in advance. The control device 160 determines that the amount of the application of the adhesive 70 is less than the appropriate amount of application when at least two of heights H1, H2 and H3, or preferably all of them, are less than reference value Hm.

It should be noted that reference value Hm may be a numerical range determined by an upper limit and a lower limit. When reference value Hm is a numerical range, the expression "heights H1, H2 and H3 are greater than reference value Hm" means that heights H1, H2 and H3 are greater than the upper limit of the numerical range. The expression "heights H1, H2 and H3 are less than reference value Hm" means that heights H1, H2 and H3 are less than the lower limit of the numerical range.

[Feedback]

When the control device 160 determines that the position of the application of the adhesive 70 is not appropriate, the control device 160 adjusts the control parameters of the carrier device 110 and the application device 120 such that the position of the application of the adhesive 70 in the suspension 10 to be manufactured next is appropriate. These control parameters include, for example, a parameter for driving the motor which moves the stage of the carrier device 110, and a parameter for driving the actuator which moves the nozzle 121 of the application device 120.

Specifically, when the control device 160 determines that the adhesive 70 is displaced in the first direction X, the control device 160 adjusts the positional relationship of the suspension 10 to be manufactured next and the nozzle 121 in the first direction X in step S2 for the suspension 10. When the control device 160 determines that the adhesive 70 is displaced in the second direction Y, the control device 160 adjusts the positional relationship of the suspension 10 to be manufactured next and the nozzle 121 in the second direction Y in step S2 for the suspension 10.

When the control device 160 determines that the amount of the adhesive 70 is not appropriate, the control device 160 adjusts the control parameters of the application device 120 such that the amount of the application of the adhesive 70 in the suspension 10 to be manufactured next is appropriate. These control parameters include, for example, a parameter for changing the pressure applied when the application device 120 applies the adhesive, and a parameter for changing the temperature of the adhesive.

Specifically, when the control device 160 determines that the amount of the application of the adhesive 70 is great, the control device 160 decreases the amount of the application of the adhesive 70 in the suspension 10 to be manufactured next. When the control device 160 determines that the amount of the application of the adhesive 70 is less, the control device 160 increases the amount of the application of the adhesive 70 in the suspension 10 to be manufactured next.

The amount of the adjustment of the position and amount of the application of the adhesive 70 in feedback may be a predetermined constant value or may be dynamically calculated based on heights H1, H2 and H3. Alternatively, correlation data in which the relationship of gaps of heights H1, H2 and H3 and the position of application and the relationship of gaps of heights H1, H2 and H3 and the amount of application are quantified may be prepared in advance. Based on heights H1, H2 and H3 measured in step S3 and the correlation data, the amount of adjustment in feedback may be determined.

For example, the inspection of the position of application and the amount of application is conducted for the adhesive 70 in each of the actuator mounting portions 50L and 50R in the same manner. Alternatively, the inspection may be conducted for the adhesive 70 of one of the actuator mounting portions 50L and 50R.

In the present embodiment explained above with reference to FIG. 1 to FIG. 12, whether or not the positions or amounts of the application of the first adhesive 71 and the second adhesive 72 in the first direction X are appropriate is determined based on the first height H1 in the first position P1 of the first adhesive 71 and the second height H2 in the second position P2 of the second adhesive 72. In this method, for example, compared to a case where image processing is used to inspect the position of application and the amount of application, the structure for inspection is simplified, and further, the accuracy of inspection is excellent.

As shown in FIG. 10, when the first position P1 and the second position P2 are displaced from center lines C1 and C2, respectively, the gaps of the positions of the application of the first adhesive 71 and the second adhesive 72 are easily reflected on the first height H1 and the second height H2. In other words, for example, in a case where a portion overlapping the first center line C1 is set as the first position P1 like position Q1 shown by a dashed circle in FIG. 10, and a portion overlapping the second center line C2 is set as the second position P2 like position Q2 shown by a dashed circle in FIG. 10, even if the first adhesive 71 and the second adhesive 72 are displaced in the first direction X, both height H1 and height H2 decrease, and thus, difference ΔHa is difficult to change from an appropriate value. For this reason, the gaps of the positions of the application of the adhesives 71 and 72 are difficult to detect.

To the contrary, regarding the first position P1 (Pa1, P1b) and the second position P2 (P2a, P2b) shown in FIG. 10, when the first adhesive 71 and the second adhesive 72 are slightly displaced in the first direction X, basically, one of heights H1 and H2 is increased, and the other is decreased. Thus, difference ΔHa is easily changed because of the gaps of the positions of the application of the adhesives 71 and 72, and the gaps are easily detected.

In the present embodiment, the third height H3 in the third position P3 of the first adhesive 71 is further used to determine whether or not the positions of the application of the first adhesive 71 and the second adhesive 72 in the second direction Y are appropriate. This configuration enables the detection of the gaps of the adhesives 71 and 72 in both the first direction X and the second direction Y.

In the configuration of the manufacturing system 100 (inspection system 200) shown in FIG. 7, the gaps of the position of application and the amount of application can be automatically detected without the intervention of a worker, and the result of the detection can be fed back. In addition, when the adhesives 70 are inspected for all of the suspensions 10 manufactured by the manufacturing system 100, the variation in the quality of the suspensions 10 can be largely suppressed.

The inspection method disclosed in the present embodiment is not limited to the application to the adhesive 70 having the shape disclosed in FIG. 5, etc., and can be applied to adhesives of various shapes. Now, this specification discloses a modification example of the present embodiment.

Figure 13:
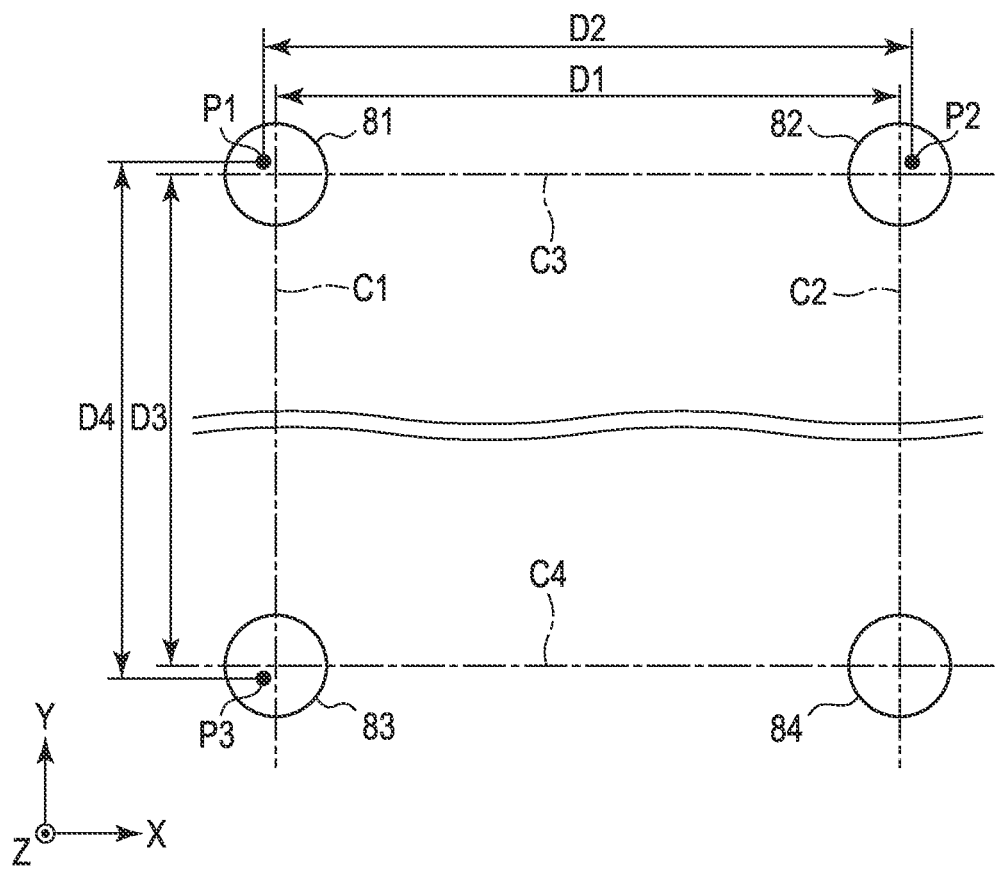
FIG. 13 is a diagram for explaining an adhesive and an inspection method thereof according to a modification example.

FIG. 13 is a diagram for explaining an adhesive and an inspection method of the position and amount of the application of the adhesive according to the modification example. This figure shows a first adhesive 81, a second adhesive 82, a third adhesive 83 and a fourth adhesive 84. They are spaced apart from each other. In the example shown in the figure, the planar shapes of these adhesives 81, 82, 83 and 84 are regular circles having the same size. It should be noted that the adhesives 81, 82, 83 and 84 may have other shapes such as an elliptic shape or a polygon. The adhesives 81, 82, 83 and 84 may be used to attach the actuator elements 60L and 60R in a manner similar to that of the above embodiment, or may be used to attach other electronic components.

In FIG. 13, the first center line C1 passes through the centers of the first adhesive 81 and the third adhesive 83 and is parallel to the second direction Y. The second center line C2 passes through the centers of the second adhesive 82 and the fourth adhesive 84 and is parallel to the second direction Y. The third center line C3 passes through the centers of the first adhesive 81 and the second adhesive 82 and is parallel to the first direction X. The fourth center line C4 passes through the centers of the third adhesive 83 and the fourth adhesive 84 and is parallel to the first direction X.

In this modification example, when the position of application and the amount of application are inspected, the heights in the first position P1 of the first adhesive 81, the second position P2 of the second adhesive 82 and the third position P3 of the third adhesive 83 are measured.

For example, each of the first position P1, the second position P2 and the third position P3 is set so as not to overlap center line C1, C2, C3 or C4 when the positions of the application of the adhesives 81, 82, 83 and 84 are appropriate as designed. Further, in a manner similar to that of the above embodiment, the first position P1, the second position P2 and the third position P3 are set such that distance D2 is different from distance D1, and distance D4 is different from distance D3.

In the example of FIG. 13, all of the first position P1, the second position P2 and the third position P3 are outside the area located between the first center line C1 and the second center line C2 and outside the area located between the third center line C3 and the fourth center line C4. It should be noted that these positions 81, P2 and P3 may be in other portions of the adhesives 81, 82 and 83. One of positions 81, P2 and P3 may be in the fourth adhesive 84.

In this modification example, the method of determining whether or not the position of application or the amount of application is appropriate by using the height in each of the first position P1, the second position P2 and the third position P3 is similar to that of the above embodiment.

The embodiment or its modification example described above is not limited to the structure disclosed in the embodiment and the modification example regarding the scope of the present invention. The present invention can be implemented by modifying the structure disclosed in the embodiment and the modification example in various ways.

For example, the adhesive in which the position of application and the amount of application are inspected may be used to attach an electronic component other than the actuator elements. The number of positions for measuring the height of the adhesive is not limited to three, and may be two, four or more. The inspection for the adhesive may be implemented regarding one of the position of application and the amount of application.

What is claimed is:

1. An inspection method of a disk drive suspension including an electronic component comprising first and second side surfaces arranged in a first direction, a first adhesive provided along the first side surface, and a second adhesive provided along the second side surface, the method comprising:
   measuring a first height in a first position of the first adhesive;
   measuring a second height in a second position of the second adhesive; and
   determining whether at least one of a position of application of the first adhesive and the second adhesive in the first direction and an amount of application of the first adhesive and the second adhesive is appropriate based on the first height and the second height,
   wherein
   the first adhesive comprises a first center in the first direction, and a first outer edge which is more distant from the second adhesive than the first center in the first direction,
   the second adhesive comprises a second center in the first direction, and a second outer edge which is more distant from the first adhesive than the second center in the first direction,
   the first position is between the first center and the first outer edge in the first direction when the position of the application of the first adhesive in the first direction is appropriate, and
   the second position is between the second center and the second outer edge in the first direction when the position of the application of the second adhesive in the first direction is appropriate.

2. The inspection method of claim 1, wherein
   the determining includes determining that the position of the application of the first adhesive and the second adhesive in the first direction is displaced from an appropriate position when a difference between the first height and the second height is different from a first reference value.

3. The inspection method of claim 1, wherein
the determining includes determining that the amount of the application of the first adhesive and the second adhesive is greater than an appropriate amount of application when both the first height and the second height are greater than a second reference value, and determining that the amount of the application of the first adhesive and the second adhesive is less than the appropriate amount of application when both the first height and the second height are less than the second reference value.

4. The inspection method of claim 1, wherein
the first adhesive and the second adhesive have a shape which is long in a second direction intersecting the first direction, and
the method further comprises:
measuring a third height in a third position of the first adhesive, the third position being spaced apart from the first position in the second direction; and
determining whether the position of the application of the first adhesive in the second direction is appropriate based on the first height and the third height.

5. The inspection method of claim 1, wherein
the electronic component is an actuator element including a piezoelectric body,
the suspension includes a first plate facing at least the second side surface in the first direction, and a second plate overlapping the first plate and having an opening overlapping the actuator element,
the first adhesive covers the first side surface and is in contact with the second plate, and
the second adhesive is put between the second side surface and the first plate and is in contact with the second plate.

6. A manufacturing method of a disk drive suspension including an electronic component comprising first and second side surfaces arranged in a first direction, a first adhesive provided along the first side surface, and a second adhesive provided along the second side surface, the method comprising:
applying the first adhesive and the second adhesive;
measuring a first height in a first position of the first adhesive;
measuring a second height in a second position of the second adhesive; and
determining whether at least one of a position of application of the first adhesive and the second adhesive in the first direction and an amount of application of the first adhesive and the second adhesive is appropriate based on the first height and the second height,
wherein
the first adhesive comprises a first center in the first direction, and a first outer edge which is more distant from the second adhesive than the first center in the first direction,
the second adhesive comprises a second center in the first direction, and a second outer edge which is more distant from the first adhesive than the second center in the first direction,
the first position is between the first center and the first outer edge in the first direction when the position of the application of the first adhesive in the first direction is appropriate, and
the second position is between the second center and the second outer edge in the first direction when the position of the application of the second adhesive in the first direction is appropriate.

7. An inspection system of a disk drive suspension including an electronic component comprising first and second side surfaces arranged in a first direction, a first adhesive provided along the first side surface, and a second adhesive provided along the second side surface, the system comprising:
a measurement device configured to measure a first height in a first position of the first adhesive and a second height in a second position of the second adhesive; and
a control device configured to determine whether at least one of a position of application of the first adhesive and the second adhesive in the first direction and an amount of application of the first adhesive and the second adhesive is appropriate based on the first height and the second height,
wherein:
the first adhesive comprises a first center in the first direction, and a first outer edge which is more distant from the second adhesive than the first center in the first direction,
the second adhesive comprises a second center in the first direction, and a second outer edge which is more distant from the first adhesive than the second center in the first direction,
the first position is between the first center and the first outer edge in the first direction when the position of the application of the first adhesive in the first direction is appropriate, and
the second position is between the second center and the second outer edge in the first direction when the position of the application of the second adhesive in the first direction is appropriate.

* * * * *